United States Patent
Yoo et al.

(10) Patent No.: US 6,774,182 B2
(45) Date of Patent: Aug. 10, 2004

(54) PROCESS FOR PREPARING THERMOPLASTIC RESIN HAVING SUPERIOR HEAT-STABILITY

(75) Inventors: Keun-Hoon Yoo, Daejeon (KR); Dong-Sung Kim, Daejeon (KR); Chan-Hong Lee, Daejeon (KR)

(73) Assignee: LG Chemical Co., Ltd., Seoul (KR)

( * ) Notice: Subject to any disclaimer, the term of this patent is extended or adjusted under 35 U.S.C. 154(b) by 0 days.

(21) Appl. No.: 10/069,412

(22) PCT Filed: Jul. 3, 2001

(86) PCT No.: PCT/KR01/01135

§ 371 (c)(1),
(2), (4) Date: Feb. 25, 2002

(87) PCT Pub. No.: WO02/02694

PCT Pub. Date: Jan. 10, 2002

(65) Prior Publication Data

US 2003/0018125 A1 Jan. 23, 2003

(30) Foreign Application Priority Data

Jul. 3, 2000 (KR) ......................................... 2000-37710

(51) Int. Cl.⁷ .............................................. C08L 51/00
(52) U.S. Cl. .............................. 525/70; 525/71; 525/86
(58) Field of Search ............................... 525/70, 71, 86

(56) References Cited

U.S. PATENT DOCUMENTS

| | | | |
|---|---|---|---|
| 3,010,936 A | 11/1961 | Irvin | |
| 4,659,790 A | 4/1987 | Shimozato et al. | ............ 526/87 |
| 4,757,109 A | 7/1988 | Kishida et al. | ............. 524/808 |
| 5,605,963 A | * 2/1997 | Leitz et al. | .................... 525/71 |
| 5,910,538 A | * 6/1999 | Padwa et al. | ................. 525/67 |

FOREIGN PATENT DOCUMENTS

| | | |
|---|---|---|
| JP | 57-149348 | 9/1982 |
| JP | 58-206657 | 12/1983 |
| JP | 61-126157 | 6/1986 |
| JP | 63-162708 | 7/1988 |
| JP | 63-235350 | 9/1988 |
| KR | 99-52367 A | 7/1999 |

* cited by examiner

*Primary Examiner*—Jeffrey Mullis
(74) *Attorney, Agent, or Firm*—Fish & Richardson P.C.

(57) ABSTRACT

The present invention relates to a process for preparing a heat-resistant thermoplastic resin, especially to a process for preparing a heat-resistant thermoplastic resin having superior heat-stability prepared by mixing a graft ABS polymer and a heat-resistant copolymer. The heat resistant thermoplastic resin prepared by the process of the present invention not only has superior heat-resistant properties, impact resistant properties, and workability, but also has superior heat-stability.

13 Claims, No Drawings

PROCESS FOR PREPARING THERMOPLASTIC RESIN HAVING SUPERIOR HEAT-STABILITY

This application claims priority of Korea patent Application No. 2000-0037710, filed on Jul. 3, 2000, the content of which is incorporated herein by reference.

BACKGROUND OF THE INVENTION (a) Field of the Invention

The present invention relates to a process for preparing a heat-resistant thermoplastic resin, more particularly to a process for preparing a heat-resistant thermoplastic resin having superior heat-stability prepared by mixing a graft ABS polymer and a heat-resistant copolymer.

(b) Description of the Related Art

Recently, in order to produce automobile having a lightweight and electric goods requiring heat resistance such as an electric rice cooker, a microwave oven etc., researches on providing heat resistant in acrylonitrile-butadiene-styrene (ABS) resin having superior impact resistance, chemical resistance, and processability etc. have been conducted.

As a method for preparing the ABS resin having a heat resistance discloses preparation by mixing blending a copolymer having a superior heat resistance with a graft ABS polymer has been suggested. As such a method, substituting a part or total amount of styrene used in the preparation of a copolymer having heat-resistance to be kneaded with α-methyl styrene having good heat-resistance (U.S. Pat. Nos. 3,010,936 and 4,659,790), incorporating maleimide compound (Japanese Patent Laid-open publication Nos. sho 58-206657, sho 63-162708, sho 63-235350, and U.S. Pat. No. 4,757,109), blending polycarbonate resin, charging inorganic material etc. are known.

However, the method of using maleimide compound to give heat resistant and the method of blending polycarbonate resin have the problem of reducing processability and are not economical due to expensive cost. The method charging inorganic material has a defect in that the impact strength is suddenly reduced. Therefore, the method for preparing a-methyl styrene copolymer by emulsion polymerization and blending it with graft ABS resin is widely used. Although this method is economical and can obtain superior impact resistance, due to the emulsion polymerization of a-methyl styrene reactivity is low and heat stability is low, and thus a lot of gases are generated and gloss property deteriorates during the processing of the resin.

SUMMARY OF THE INVENTION

It is an object of the present invention to provide a method for preparing a thermoplastic resin having excellent heat-resistance, thermal stability, impact resistance, and processability.

In order to achieve the object, the present invention provides a method for preparing a thermoplastic resin composition having excellent heat-resistance and heat stability comprising the steps of:

a) preparing a graft ABS polymer by an emulsion polymerization of:

i) 40 to 70 wt parts of conjugated diene rubber latex;

ii) 15 to 40 wt parts of aromatic vinyl compound; and iii) 5 to 20 wt parts of vinyl cyanide b) preparing a copolymer having heat-resistance by a mass polymerization of:

i) 50 to 80 wt parts of aromatic vinyl compound; and ii) 20 to 50 wt parts of vinyl cyanide; and c) blending the graft ABS polymer and the copolymer having heat-resistance.

DETAILED DESCRIPTION OF THE PREFERRED EMBODIMENTS

The present invention is described in detail as follows.

The present invention prepares a thermoplastic resin having superior heat-resistance, impact resistance and processability, particularly having excellent thermal stability, by preparing a graft ABS polymer having superior thermal stability and impact resistance by an emulsion polymerization with optimizing particle size and gel content of the rubber latex, and controlling the graft ratio of the polymer and preparing a copolymer having superior heat-resistance, thermal stability and processability with controlling the molecular chain structure by mass polymerization, and then blending the graft ABS polymer with the copolymer having superior heat resistance.

The present invention is described in detail according to the preparation step as follows.

The graft ABS polymer is prepared by conducting a graft copolymerization of conjugated diene rubber latex, aromatic vinyl compound and vinyl cyanide compound by emulsion polymerization.

(Preparation of the Graft ABS Polymer)

The particle size and gel content of the conjugated diene rubber latex used in the preparation of the graft ABS polymer has a very large influence on the impact strength and processability of resin. Generally, as the particle size of rubber latex becomes small, the impact resistance and processability reduces, and as the particle size becomes large, the impact resistance improves. Also, as the gel content becomes low, polymerization occurs due to the swelling of monomers on the inside of the rubber latex, and thus as the apparent particle size becomes larger, the impact strength improves.

When preparing the graft ABS polymer, the graft ratio largely affects the property of the polymer. Thus, if the graft ratio is reduced, the un-grafted bare rubber latex exists, and thus thermal stability deteriorates. Also, as the gel content of the rubber latex is large, as the particle diameter is large, and as the graft ratio falls, the improvement of thermal stability is limited.

Therefore, the method for preparing the conjugated diene rubber latex having a suitable particle diameter and gel content is very important, and when the aromatic vinyl compound and vinyl cyanide compound is grafted in the conjugated diene rubber latex, the method for improving graft ratio is very important.

The graft ABS polymer prepares is as follows. The rubber latex having a small diameter is prepared, and the rubber latex having a large diameter is prepared by fusing the rubber latex having a small diameter, and then the aromatic vinyl compound and vinyl cyanide compound is mixed in the rubber latex having a large diameter, and the graft ABS polymer is prepared through graft copolymerization by emulsion polymerization of the mixture.

The conjugated diene rubber latex is preferably aliphatic conjugated diene compound, or the mixture of the aliphatic conjugated diene compound and ethylene-based unsaturated monomer.

As to the first step, the method for preparing the rubber latex having a small diameter is described as follows.

The rubber latex having a small diameter is conjugated diene polymer, which preferably has a particle diameter of 600 to 1500 Å, gel content of 70 to 95% and swelling index of 12 to 30.

The rubber latex having a small diameter is prepared by simultaneously introducing 100 wt parts of conjugated diene monomer, 1 to 4 wt parts of the emulsifier, 0.1 to 0.6 wt parts of the polymerization initiator, 0.1 to 1.0 wt parts of the electrolyte, 0.1 to 0.5 wt parts of the molecular weight controlling agent, 90 to 130 wt parts of the ion exchanged water in reactor, and reacting for 5 to 15 hrs at 55 to 70° C.

The emulsifier is alkyl aryl sulfonate, alkalimetal alkyl sulfate, sulfonate alkyl ester, soap of fatty acid, alkali salts of rosinate etc., which can be used alone or in combination of two kinds or more.

The polymerization initiator that can be used is aqueous persulfate or peroxycompound, and oxidation-reduction system compound also can be used. More particularly, the polymerization initiator of aqueous persulfate of sodium or potassium persulfate etc., a fat-soluble polymerization initiator such as cumene hydroperoxide, diisopropylbenzene ydroperoxide, azobis-isobutyinitrile, tert-butylhydroperoxide, paramethane hydroperoxide, benzoyl peroxide etc. can be used, which also can be used alone or in combination of two kinds or more.

The electrolyte can be used alone or in combination of two kinds or more. It is preferably selected from the group consisting of $KCl$, $NaCl$, $KHCO_3$, $NaHCO_3$, $K_2CO_3$, $Na_2CO_3$, $KHSO_3$, $NaHSO_3$, $K_4P_2O_7$, $K_3PO_4$, $Na_3PO_4$, $K_2HPO_4$, and $Na_2HPO_4$ etc.

The molecular weight controlling agent is preferably of mercaptan series.

The polymerization temperature for preparing latex having a small diameter is very important to control the gel content and swelling index of the rubber latex, wherein the selection of initiator should be considered.

As to the second step, the method for preparing the rubber latex having a large diameter is described as follows.

Rubber latex having a large diameter is prepared by fusing rubber latex having a small diameter. Generally, the rubber latex having a large diameter provides high impact property in a thermoplastic resin, and thus preparation thereof is very important. In order to satisfy the properties in the present invention, the particle diameter is preferably from 2500 to 5000 Å.

The size of the particle is increased by slowly introducing 2.5 to 4.5 wt parts of acetic acid for 1 hr into 100 wt parts of the rubber latex having a small diameter prepared by the above-described method, which has a particle diameter of 600 to 1500 A, gel content of 70 to 95%, and swelling index s 12 to 30, and then agitation is stopped and the rubber latex having increased particle diameter is fused to prepare rubber latex having a large diameter which has particle diameter of 2500 to 5000 Å, gel content of 70 to 95%, and swelling index of 12 to 30.

A grafting process will be described. The process is to mix aromatic vinyl compound and vinyl cyanide compound in the rubber latex having a large diameter, and conduct graft copolymerization of the mixture by an emulsion polymerization.

15 to 40 wt parts of aromatic vinyl compound, 5 to 20 wt parts of vinyl cyanide, 0.2 to 0.6 wt parts of emulsifier, 0.2 to 0.6 wt parts of the molecular weight controlling agent, 0.1 to 0.5 wt parts of the polymerization initiator etc. are added to 40 to 70 wt parts of the conjugated diene the rubber latex having a large diameter prepared by the above method to conduct a graft copolymerization. Wherein, polymerization temperature is preferably 45 to 80° C. and the polymerization time is preferably 3 to 5 hrs.

In the graft polymerization, each component can be simultaneously introduced, dividedly introduced in multi-stages, or continuously introduced. In order to improve graft ratio and minimize the formation of solid material, the multi-stage introduction or continuous introduction is preferable.

The aromatic vinyl compound is preferably selected from the group consisting of styrene, a-methyl styrene, o-ethyl styrene, p-ethyl styrene, and vinyl toluene.

The vinyl cyanide compound is preferably selected from the group consisting of acrylonitrile, methacrylonitrile, and ethacrylonitrile.

The emulsifier used in polymerization reaction is alkyl aryl sulfonate, alkali methyl alkyl sulfate, sulfonated alkyl ester, soap of fatty acid, alkali salt of rosinate etc., it may be used alone or as a mixture of more than two kinds.

The molecular weight controlling agent is preferably tertiary dodecylmercaptan.

As the polymerization initiator, an oxidation-reduction catalyst system prepared by a mixture of peroxide such as cumenhydroperoxide, diisopropylbenzenehydroperoxide, persulfate etc., and reductant such as sodium formaldehyde sulfoxylate, sodium ethylenediamine tetra-acetate, ferrous sulfate, dextrose, sodium pyrrolinate, sodium sulfite etc.

After polymerization is complete, the polymerization conversion ratio of the obtained latex is over 96%. An antioxidant and a stabilizer are added to the latex, and the latex is solidified with the aqueous solution of sulfuric acid at temperature of over 80° C. and then dehydrate and dried to obtain powders.

The stability of the graft copolymer latex is evaluated by measuring the solidified content (%/) as described in Equation 1 below.

Solidified content (%)=(weight of formed solid material in reactor (g)/weight of total rubber and monomer)×100    [Equation 1]

When the solidified content is over 0.7%, the stability of the latex deteriorates, and a graft polymer suitable for the present invention cannot be obtained due to a plenty of solid material.

In addition, the graft ratio of the graft polymer is measured as follows. The graft polymer latex is obtained in a powder form by solidifying, washing, and drying. And then, 2 g of the powder is stirred for 24 hrs with the addition of 300 ml of acetone. The solution separates by using ultra-centrifuge, and the un-grafted part is obtained by dropping separated acetone solution to methanol, and dried and the weight of the un-grafted part is measured. The graft ratio is measured according to Equation 2 below using the measurement value.

Graft ratio (%)=(weight of grafted monomer/weight of rubber property)×100    [Equation 2]

Wherein, if the graft ratio is below 25%, thermal stability deteriorates and thus the graft polymer is not suitable for the present invention.

(Preparation of a Copolymer Having Heat-Resistant)

A copolymer having heat-resistance is prepared with controlling a ratio of aromatic vinyl compound and vinyl cyanide compound by using mass polymerization.

The aromatic vinyl compound is preferably selected from the group consisting styrene, α-methyl styrene, o-ethyl styrene, p-ethyl styrene, and vinyl toluene, and α-methyl styrene is more preferable.

The vinyl cyanide compound is preferably selected from the group consisting of acrylonitrile, methacrylonitrile, and ethacrylonitrile, acrylonitrile monomer is more preferable.

As an example of the preparation, 50 to 80 wt parts of α-methylstyrene monomer, 20 to 50 wt parts of acrylonitrile, 26 to 30 wt parts of toluene as a solvent, 0.1 to 0.5 wt parts of di-tert-dodecylmercaptan as a molecular weight controlling agent are introduced into a reactor, and the mixture is polymerized while maintaining introduced amount so that average reaction time becomes 2 to 4 hrs and maintaining reaction temperature to 140 to 170 °C. This preparation process is performed by a continuous process in a reactor consisting of a pump for adding raw material, a continuous agitation bath, a pre-heating bath, and an evaporation bath, a pump for transferring polymer and extruder.

The distribution of the molecular chain structure of the obtained copolymer of α-methylstyrene (AMS) and acrylonitrile (AN) is analyzed using $^{13}$C NMR analyzer. The obtained pellet is dissolved in deuterium chloroform, and NMR peaks are measured using tetramethylsilane as the inner standard material. In the measured peak of 140~150 ppm, those appearing in the range of 141 to 144 ppm are regarded as a chain structure of alphamethylstyrene-acrylonitrile-acrylonitrile (AMS-AN-AN), and those appearing in the range of 147.5 to 150 ppm are regarded as a chain structure of alphamethyl styrene-alphamethylstyrene-acrylonitrile (AMS-AMS-AN). And, the area of these peaks are measured and analyzed.

If the chain structure of alphamethylstyrene-alphamethylstyrene-alphamethylstyrene (AMS-AMS-AMS) is 15% or more of total 100% of chain structures, thermal stability reduces due to the pyrolysis of alphamethylstyrene-alphamethylstyrene-alphamethylstyrene (AMS-AMS-AMS) when processing. If the chain structure of alphamethylstyrene-acrylonitrile-acrylonitrile (AMS-AN-AN) is over 45%, heat-resistant is inferior. Thus, the molecular structure of the copolymer having heat-resistance preferably comprises less than 15% of the chain structures of alphamethylstyrene-alphamethylstyrene-alphamethylstyrene (AMS-AMS-AMS), and comprises 45% or less of the chain structures of alphamethylstyrene-acrylonitrile-acrylonitrile (AMS-AN-AN).

(Blending Process)

The thermoplastic resin having excellent heat resistance and thermal stability is prepared by introducing additives such as a lubricant, an antioxidant, and a light stabilizer etc. into the graft ABS polymer prepared by an emulsion polymerization and the copolymer having heat resistance prepared by a mass polymerization, and then blending.

The mixing ratio of the graft ABS polymer and the copolymer having heat resistance is preferably 20:80~80:20.

The resin is prepared in pellet form using a double screw extrusion mixer at 230 to 250 °C. and then the pellet is injected to measure the properties thereof.

The properties are measured by ASTM method, wherein the thermal stability of the thermoplastic resin having heat resistance is examined by color deviation of the specimen before and after retention of the pellet at 250° C. for 15 minutes using an extruder. As the color deviation is less, the thermal stability of the thermoplastic resin is superior.

Hereinafter, the present invention is described in more detail through the following EXAMPLES and COMPARATIVE EXAMPLES. However, the following EXAMPLES are only for the understanding of the present invention, and the present invention is not limited to the following EXAMPLES.

EXAMPLES

Example 1 a) Preparation of a graft ABS polymer (Preparation of Rubber Latex having a Small Diameter)

100 wt parts of ion exchanged water, 100 wt parts of 1,3-butadiene as a monomer, 1.2 wt parts of potassium rosinate as an emulsifier, 1.5 wt parts of potassium oleate, 0.1 wt parts of $Na_2CO_3$ as an electrolyte, 0.5 wt parts of $KHCO_3$, and 0.3 wt parts of tert-dodecyl mercaptan (TDDM) as a molecular weight controlling agent were simultaneously introduced into a nitrogen-substituted polymerization reactor (autoclave). The reaction temperature was elevated to 55° C. and then reaction was initiated by simultaneously introducing 0.3 wt parts of potassium sulfite as an initiator in the reactor, and the reaction mixture was reacted for 10 hrs. Thereafter, 0.3 wt parts of tert-dodecyl mercaptan (TDDM) was further added to the reactant, and then the reaction was continued for 8 hrs at 65° C. and completed to obtain rubber latex. The obtained rubber latex was analyzed.

The gel content, the swelling index, and the particle diameter of the rubber latex were measured and analyzed.

The gel content and swelling index was determined as follows.

The rubber latex was solidified with diluted acid or metal salt, and the solid was washed and dried in a vacuum oven for 24 hrs at 60° C. The obtained rubber mass was cut into small pieces with scissors, and 1 g of the rubber slice was added to 100 g of toluene, and then was stored in a dark room at room temperature for 48 hrs. The resultant was separated to sol and gel, and then the gel content and swelling index were measured according to Equations 3 and 4 below.

Gel content (%)=(weight of insoluble part (gel)/weight of sample)×100     [Equation 3]

Swelling index=weight of swelled gel/weight of the gel     [Equation 4]

The particle diameter was measured by the dynamic laser-light scattering method using Nicomp (Model: 370HPL).

Wherein, the particle diameter of the obtained rubber latex was 1000 Å, the gel content was 90%, and swelling index was 18.

(Preparation of Rubber Latex Having a Large Diameter—Fusion of the Rubber Latex Having a Small Diameter)

100 wt parts of the prepared rubber latex having a small diameter was added in the reactor, the stirring speed was controlled to 10 rpm, and the temperature was controlled to 30° C. and then 3.0 wt parts of solution 7 wt % aqueous solution of acetic acid was slowly added in the reactor for 1 hr. Thereafter, the agitation was stopped, and the conjugated diene latex having a large diameter was prepared by fusing the rubber latex having a small diameter by leaving the resultant for 30 min. The rubber latex having a large diameter was analyzed by the same method measuring the rubber latex having a small diameter.

The particle diameter of the rubber latex having a large diameter was 3100 Å, the gel content was 90%, and the swelling index was 17.

(Grafting process)

50 wt parts of the rubber latex having a large diameter prepared by fusion process, 65 wt parts of ion exchanged water, 0.35 wt parts of potassium rosinate as an emulsifier, 0.1 wt parts of sodium ethylene diamine tetraacetate, 0.005 wt parts of ferrous sulfate, and 0.23 wt parts of formaldehyde sodium sulfoxylatet were simultaneously introduced into a nitrogen-substituted polymerization reactor, and the temperature was raised to 70° C. The mixed emulsion of 50 wt parts of ion exchanged water, 0.65 wt parts of potassium rosinate, 35 wt parts of styrene, 15 wt parts of acrylonitrile, 0.4 wt parts of tert-dodecylmercaptan, and 0.4 wt parts of diisopropylenehydroperoxide was continuously introduced into the reactor for 3 hrs, and the temperature was raised to 80° C. and then the reaction was completed after aging for 1 hr.

Wherein, the polymerization conversion ratio was 97.5%, the solidified content was 0.2%, and the graft ratio was 37%. This latex was solidified with aqueous solution of sulfuric acid and washed, to obtain powder.

b) Preparation of copolymer having heat resistance 30 wt parts of toluene as a solvent 0.15 wt parts of di-tert-dodecylmercaptan as a molecular weight controlling agent in 70 wt parts of α-methyl styrene, and 30 wt parts of acrylonitrile were continuously introduced in a reactor while maintaining reaction temperature of 148° C. so that average reaction time becomes 3 hrs. The discharged polymerization solution in the reactor was heated in a preheater, the un-reacted monomer was volatilized in evaporation reactor, and then the temperature of the polymer was maintained at 210° C. Thereafter, the copolymer resin was processed in a pellet form using a transfer pump and an extruder.

The molecular chain structure of the obtained heat-resistant copolymer was analyzed using $^{13}$C NMR analyzer. As a result, the chain structure of AMS-AMS-AMS was 3%, the chain structure of AMS-AN-AN was 20%.

c) Blending process 0.5 wt parts of lubricant and 0.3 wt parts of antioxidant, and 0.1 wt parts of light stabilizer were added and mixed in the mixture of 40 wt parts of ABS polymer prepared by the emulsion polymerization and 60 wt parts of the heat-resistant copolymer prepared by mass polymerization. And, then the pellet was prepared using a double screw extruder at 240° C. and the pellet was injected again and the properties were measured, and the result was shown in Table 1.

Example 2 a) Preparation of graft ABS polymer

The graft ABS polymer was prepared by the same method as Example 1, except that in a grafting process, 60 wt parts of the rubber latex having a large diameter, 28 wt parts of styrene, and 12 wt parts of acrylonitrile were used. The graft ratio was 30%, and the solidified content was 0.3%.

b) Preparation of copolymer having heat-resistant

The copolymer having heat resistance was prepared by the same method as Example 1.

The molecular structure of the obtained heat-resistant copolymer was analyzed using $^{13}$C NMR analyzer. As a result, the chain structure of AMS-AMS-AMS was 4%, the chain structure of AMS-AN-AN was 22%.

c) Blending process

The thermoplastic resin having heat resistance was prepared by the same process as Example 1, except that the graft ABS polymer and heat-resistant copolymer were used in the ratio (the additive was the same) as shown in Table 1 below.

The properties of the prepared heat-resistant thermoplastic resin are shown in Table 1 below.

Example 3 a) Preparation of graft ABS polymer

The graft ABS polymer was prepared by the same method as Example 1, except that in grafting process, 45 wt parts of the rubber latex having a large diameter, 38 wt parts of styrene, and 17 wt parts of acrylonitrile. The graft ratio was 45%, and the content of the solid type solidification part was 0.1%.

b) Preparation of copolymer having heat-resistance

The heat-resistant copolymer was prepared by the same method as in Example 1.

The molecular structure of the obtained heat-resistant copolymer was analyzed using $^{13}$C NMR analyzer. As a result, the chain structure of AMS-AMS-AMS was 5%, the chain structure of AMS-AN-AN was 19%.

c) Blending process

The thermoplastic resin was prepared by the same process as Example 1, except that the graft ABS polymer and heat-resistant copolymer were used in the ratio (the additive was the same) as shown in Table 1 below.

The properties of the prepared heat-resistant thermoplastic resin are shown in Table 1 below.

Example 4 a) Preparation of graft ABS polymer

The rubber latex having a small diameter (95% of gel content) was prepared by the same method as Example 1, except that 99 wt parts of 1,3-butadiene, and 1 wt parts of styrene were used instead of 100 wt parts of 1,3-butadiene as monomer, and the rubber latex having a large diameter was prepared, and then the graft ABS polymer was prepared through the grafting process.

b) Preparation of heat-resistant copolymer

The heat-resistant copolymer was prepared by the same method as in Example 1.

The molecular structure of the obtained heat-resistant copolymer was analyzed using $^{13}$C NMR analyzer. As a result, the chain structure of AMS-AMS-AMS was 3%, the chain structure of AMS-AN-AN was 21%.

c) Blending process

The thermoplastic resin having heat resistant was prepared by the same process as Example 1, except that the graft ABS polymer and heat-resistant copolymer were used in the ratio (the additive was the same) as shown in Table 1 below.

The properties of the prepared heat-resistant thermoplastic resin are shown in Table 1 below.

Comparative Example 1 a) Preparation of the graft ABS polymer

The rubber latex having a small diameter was prepared by the same method as Example 1, except that in preparation of the rubber latex having a large diameter, the content of acetic acid for fusing the rubber latex having a small diameter was changed to 20 wt parts. The particle diameter of the rubber latex having a large diameter was 2200 Å.

The graft ABS polymer was prepared through grafting process by the same method as in Example 1, except the above.

b) Preparation of copolymer having heat-resistance

The heat-resistant copolymer was prepared by the same method as in Example 1.

The molecular structure of the obtained heat-resistant copolymer was analyzed using $^{13}$C NMR analyzer. As a result, the chain structure of AMS-AMS-AMS was 4%, the chain structure of AMS-AN-AN was 20%.

c) Blending process

The heat-resistant thermoplastic resin was prepared by the same mixing process as Example 1, except that the graft ABS polymer and heat-resistant copolymer was used in the ratio (the additive was the same) as shown in Table 1 below.

The properties of the prepared heat-resistant thermoplastic resin are shown in Table 1 below.

Comparative Example 2 a) Preparation of a graft ABS polymer

The rubber latex having a small diameter (65% of the gel content) was prepared by the same method as Example 1, except that polymerization temperature was lowered by 3° C. in the process of preparing rubber latex having a small diameter. The rubber latex having a large diameter was prepared, and the graft ABS polymer was prepared through the grafting process by the same method as Example 1.

b) Preparation of copolymer having heat-resistance

The heat-resistant copolymer was prepared by the same method as in Example 1.

The molecular structure of the obtained heat-resistant copolymer was analyzed using $^{13}$C NMR analyzer. As a result, the chain structure of AMS-AMS-AMS was 5%, the chain structure of AMS-AN-AN was 22%.

c) Blending process

The heat-resistant thermoplastic resin was prepared by the same mixing process as Example 1, except that the graft ABS polymer and heat-resistant copolymer were used in the ratio (the additive was the same) as shown in Table 1 below.

The properties of the prepared heat-resistant thermoplastic resin are shown in Table 1 below.

Comparative Example 3 a) Preparation of graft ABS polymer

The graft ABS polymer was prepared through a grafting process by the same method as Example 1, except that 71 wt parts of the rubber latex having a large latex and 20 wt parts of styrene, and 9 wt parts of acrylonitrile were used in the grafting process. The grafting ratio was 20%, the solidified content was 0.4%.

b) Preparation of copolymer having heat-resistance

The heat-resistant copolymer was prepared by the same method as Example 1.

The molecular structure of the obtained heat-resistant copolymer was analyzed using $^{13}$C NMR analyzer. As a result, the chain structure of AMS-AMS-AMS was 5%, the chain structure of AMS-AN-AN was 23%.

c) Blending process

The heat-resistant thermoplastic resin was prepared by the same mixing process as Example 1, except that the graft ABS polymer and heat-resistant copolymer were used in the ratio (the additive was the same) as shown in Table 1 below.

The properties of the prepared heat-resistant thermoplastic resin are shown in Table 1 below.

Comparative Example 4 a) Preparation of the graft ABS polymer

The graft ABS polymer was prepared by the same method as in Example 1.

b) Preparation of copolymer having heat-resistant

A heat-resistant copolymer was prepared by the same method as in Example 1, except that 55 wt parts of a-methyl styrene and 45 wt parts of acrylonitrile, instead of 70 wt parts of α-methyl styrene and 30 wt parts of acrylonitrile, was used.

The molecular structure of the obtained heat-resistant copolymer was analyzed using $^{13}$C NMR analyzer. As a result, the chain structure of AMS-AMS-AMS was 1%, the chain structure of AMS-AN-AN was 45%.

c) Blending process

The heat-resistant thermoplastic resin was prepared by the same process as the Example 1, except that the graft ABS polymer and heat-resistant copolymer were used in the ratio (the additive was the same) as shown in Table 1 below.

The properties of the prepared heat-resistant thermoplastic resin are shown in Table 1 below.

Comparative Example 5 a) Preparation of the graft ABS polymer

A graft ABS polymer was prepared by the same method as in Example 1.

b) Preparation of copolymer having heat-resistant

A heat-resistant copolymer was prepared by the same method as in Example 1, except that 85 wt parts of a-methyl styrene and 15 wt parts of acrylonitrile, instead of 70 wt parts of a-methyl styrene and 30 wt parts of acrylonitrile were used.

The molecular structure of the obtained heat-resistant copolymer was analyzed using $^{13}$C analyzer. As a result, the chain structure of AMS-AMS-AMS was 19%, the chain structure of AMS-AN-AN was 8%.

c) Blending process

The heat-resistant thermoplastic resin was prepared by the same process as Example 1, except that the graft ABS polymer and heat-resistant copolymer were used in the ratio (the additive was the same) as shown in Table 1 below.

The properties of the prepared heat-resistant thermoplastic resin are shown in Table 1 below.

Comparative Example 6 a) Preparation of the graft ABS polymer

A graft ABS polymer was prepared by the same method as in Example 1.

b) Preparation of copolymer having heat-resistant

A heat resistant copolymer prepared by emulsion polymerization (PW600A, products of LG. CHEMICAL CO. LTD) was used, instead of the heat resistant copolymer prepared by mass polymerization.

The molecular structure of the heat-resistant copolymer prepared by emulsion polymerization was analyzed using $^{13}$C NMR analyzer, the chain structure of AMS-AMS-AMS was 8%, the chain structure of AMS-AN-AN was 30%.

c) Blending process

The heat-resistant thermoplastic resin was prepared by the same mixing process as Example 1, except that the graft ABS polymer and heat-resistant copolymer were used in the ratio (the additive was the same) as shown in Table 1 below.

The properties of the prepared heat-resistant thermoplastic resin are shown in Table 1 below.

TABLE 1

The thermoplastic resin composition having heat resistance prepared by the method according to the present invention has an especially excellent thermal stability, as well as having an excellent heat-resistance, impact resistance, and processability.

| | Example | | | | Comparative Example | | | | | |
|---|---|---|---|---|---|---|---|---|---|---|
| | 1 | 2 | 3 | 4 | 1 | 2 | 3 | 4 | 5 | 6 |
| Graft ABS polymer (Wt parts) | 40 | 38 | 39 | 40 | 40 | 38 | 39 | 40 | 38 | 39 |
| Copolymer having heat resistance (Wt parts) | 60 | 62 | 61 | 60 | 60 | 62 | 61 | 60 | 62 | 61 |
| Notch izod impact strength (ASTM D-256) | 45 | 41 | 42 | 46 | 18 | 36 | 37 | 48 | 35 | 26 |
| Flow index (ASTM D-1238) | 6 | 7 | 7 | 6 | 6 | 7 | 6 | 6 | 7 | 4 |
| Heat deflection temperature (° C.) (ASTM D-648) | 105 | 106 | 105 | 104 | 106 | 106 | 106 | 100 | 108 | 106 |
| Thermal stability (ΔE) | good 2.7 | good 3.4 | good 3.1 | good 2.9 | good 2.9 | ordinary 3.8 | ordinary 3.9 | good 1.8 | bad 7.2 | ordinary 3.9 |

What is claimed is:

1. A method for preparing a thermoplastic resin composition, which comprises the steps of:
   a) preparing a graft ABS polymer by emulsion polymerization of:
      i) 40 to 70 wt parts conjugated diene rubber latex;
      ii) 15 to 40 wt parts an aromatic vinyl compound; and
      iii) 5 to 20 wt parts a vinyl cyanide;
   b) preparing a copolymer by:
      i) mixing 55 to 80 wt part alphamethyl styrene, 20 to 45 wt part acrylonitrile, 26 to 30 wt parts a solvent; and 0.1 to 0.5 wt parts a molecular weight controlling agent in a polymerization reactor; and
      ii) conducting a mass polymerization at 140~170° C. for 2~4 hours;
      wherein the copolymer comprises less than 15% alphamethyl styrene-alphamethyl styrene-alphamethyl styrene chain and 45% or less alphamethyl styrene-acrylonitrile-acrylonitrile chain; and
   c) blending the graft ABS polymer and the copolymer.

2. The method according to claim 1, wherein the conjugated diene rubber latex has a number average particle size of 2500~5000 Å, a gel content of 70~95%, and a swelling index of 12~30.

3. The method according to claim 1, wherein the graft ABS polymer has a graft rate of 26% or more, as percentage of the weight of grafted monomers based on the weight of the rubber latex.

4. The method according to claim 1, wherein the conjugated diene rubber latex is an aliphatic conjugated diene compound, or a mixture of an aliphatic conjugated diene compound and an ethylene-based unsaturated monomer.

5. The method according to claim 1, wherein the a) ii) aromatic vinyl compound is selected from the group consisting of styrene, α-methyl styrene, o-ethyl styrene, ρ-ethyl styrene, and vinyl toluene.

6. The method according to claim 1, wherein the a) iii) vinyl cyanide is selected from the group consisting of acrylonitrile, methacrylonitrile, and ethacrylonitrile.

7. The method according to claim 1, wherein in step c), 20 to 80 wt parts the graft ABS polymer and 80 to 20 wt parts the copolymer are blended.

8. The method according to claim 1, wherein in step c), one or more additives selected from the group consisting of a lubricant, an antioxidant, a light stabilizer are further added.

9. The method according to claim 1, wherein the conjugated diene rubber latex is prepared by:
   a) simultaneously introducing 100 wt parts a conjugated diene, 1~4 wt parts an emulsifier, 0.1~0.6 wt parts a polymerization initiator, 0.1~1.0 wt parts an electrolyte, 0.1~0.5 wt parts a molecular weight controlling agent, and 90~130 wt parts ion exchanged water into a polymerization reactor, and reacting them at 50 to 65° C. for 7 to 12 hours;
   b) simultaneously introducing 0.05~1.2 wt parts a molecular weight controlling agent into the reactant obtained in step a), and reacting them at 55 to 70° C. for 5 to 15 hours to prepare conjugated diene rubber latex having a small diameter, which has a number average particle diameter of 600~1500 Å, a gel content of 7~95%, and a swelling index of 12~30; and
   c) introducing 2.5~4.5 wt parts an acetic acid aqueous solution into 100 wt parts the conjugated diene rubber latex having a small diameter prepared in step b) while stirring for 1 hour to increase particle size of the latex, thereby preparing conjugated diene rubber latex having a large diameter, which has a number average particle diameter of 2500~5000 Å, a gel content of 70~95% and a swelling index of 12~30.

10. The method according to claim 1, wherein the graft ABS polymer is prepared by:
   a) adding
      i) 40 to 70 wt parts the conjugated diene rubber latex;
      ii) 15 to 40 wt part the aromatic vinyl compound;
      iii) 5 to 20 wt part the vinyl cyanide compound;
      iv) 0.2 to 0.6 wt parts an emulsifier;
      v) 0.2 to 0.6 wt parts a molecular weight controlling agent; and vi) 0.1 to 0.5 wt parts of a polymerization initiator into a polymerization reactor, and b) conducting a graft copolymerization under conditions of polymerization temperature of 45 to 80° C. and polymerization time of 3 to 5 hrs.

11. The method according to claim 10, wherein introduction is conducted simultaneously, in multi-stage or continuously.

12. The method according to claim 10, wherein the emulsifier is selected from the group consisting of alkyl aryl sulfonate, alkalimetal alkyl sulfate, sulfonated alkyl ester, soap of fatty acid, alkali salts of rosinate, and a mixture thereof.

13. The method according to claim 10, wherein the polymerization initiator is selected from the group consisting of cumene hydroperoxide, diisopropyl benzene hydroperoxide, persulafate, sodium formaldehyde sulfoxylate, sodium ethylene diamine tetraacatate, ferrous sulfate, dextrose, sodium pyrrolinate, sodium sulfite, and a mixture thereof.

* * * * *